(12) United States Patent
White et al.

(10) Patent No.: US 6,424,324 B1
(45) Date of Patent: Jul. 23, 2002

(54) DISPLAY DRIVER APPARATUS

(75) Inventors: Charles Michael White, Escondido, CA (US); William Adamson Lagoni, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/581,415
(22) PCT Filed: Dec. 12, 1997
(86) PCT No.: PCT/US97/22765
§ 371 (c)(1),
(2), (4) Date: Nov. 9, 2000
(87) PCT Pub. No.: WO99/31876
PCT Pub. Date: Jun. 24, 1999

(51) Int. Cl.[7] .............................................. G09G 1/06
(52) U.S. Cl. .................................. 345/11; 348/707
(58) Field of Search ........................... 345/204, 10, 11; 348/380, 707, 706, 177, 180; 315/387

(56) References Cited

U.S. PATENT DOCUMENTS

| 4,599,642 A | * | 7/1986 | Willis | 348/379 |
|---|---|---|---|---|
| 4,631,595 A | * | 12/1986 | George | 348/379 |
| 4,639,785 A | | 1/1987 | Tallant, II et al. | |
| 4,682,233 A | * | 7/1987 | Hinn | 348/695 |
| 5,448,311 A | * | 9/1995 | White et al. | 330/254 |
| 5,680,173 A | | 10/1997 | White et al. | |
| 5,835,161 A | * | 11/1998 | Keller | 348/379 |

* cited by examiner

Primary Examiner—Kent Chang
(74) Attorney, Agent, or Firm—Joseph S. Tripoli; Paul P. Kiel

(57) ABSTRACT

An emitter follower amplifier is coupled between the output of a high voltage video amplifier and the cathode of a kinescope for reducing the effective capacitance presented to the video amplifier that is attributable to the kinescope cathode, socket, spark gaps, and related stray capacitances. A secondary undesired capacitance loading of the video amplifier is effectively reduced by regulating the collector-emitter voltages of the emitter follower output transistors at substantially constant values thereby improving parameters such as slew rate and bandwidth of the overall video display system. Nonlinear circuitry in the follower circuit facilitates accurate AKB current sensing and provides simplification of the voltage regulation circuitry. White limiting circuitry is included within the video amplifier for reducing excess peak white drive that results in objectionable smears. Black limiting circuitry within the video amplifier is also provided to prevent the collapse of the collector-emitter voltage of the push-pull follower output transistor. The heat sink capacitance of the video amplifier output transistor is screened out via bootstrapping.

10 Claims, 4 Drawing Sheets

DISPLAY DRIVER APPARATUS

This invention relates to amplifiers generally and particularly to an apparatus for providing amplification of a video signal for driving the cathode electrode of a kinescope.

In television apparatus employing direct view or projection kinescopes as display devices, it is desirable that the amplifier driving the kinescope cathode provide a relatively high voltage drive signal having a wide bandwidth and a high slew rate. Typically, drive voltages may be on the order of 200 volts or more and bandwidths may be substantially higher than conventional television standards in certain applications, for example, where both conventional TV viewing and data display are desired. Even higher bandwidths may be required in video applications requiring scanning at two times of more of the standard TV line rate.

To facilitate high voltage operation it is common to employ a cascode configuration of a common emitter input stage driving a common base output stage. Such a configuration requires only one high voltage transistor (the output stage) and since it is connected in a common base configuration the Miller effect is suppressed and very wide bandwidth operation is thus possible. In practice, the actual bandwidth and slew rate which may be achieved in a cascode amplifier depends, to a great extent, on the effective load capacitance presented to the output stage and the available output current.

In general, one may either increase the amplifier operating current or decrease the effective load capacitance to maximize the bandwidth and slew rate of the amplifier. However, since increasing the current necessarily implies increasing the amplifier power dissipation, it is preferable to take steps to reduce the effective load capacitance for improved performance rather than resort to increases in operating power.

In kinescope driver applications, the "effective" load capacitance presented to the amplifier is principally that of the kinescope cathode and stray capacitances associated with the socket, spark gaps, wiring and the like. An effective approach to reducing the effective capacitance loading is to couple the amplifier to the cathode by means of a push-pull complementary emitter follower amplifier. Such an amplifier effectively "isolates" the load capacitance approximately in proportion to the reciprocal of the transistor current gain ("beta"). The additional current provided by the follower amplifier provides faster charging and discharging of the load capacitance and thus enhances slew rate and bandwidth. To avoid substantially increasing the quiescent power dissipation, it is customary practice to operate the follower amplifier in a "class-B" mode in which the push-pull transistors are biased to avoid simultaneous conduction.

An example of a kinescope driver amplifier in which the load of a cascode amplifier is coupled to the cathode of a kinescope via a push-pull complementary emitter follower amplifier for load capacitance reduction is described, for example, by John H. Furrey, in U.S. Pat. No. 4,860,107 entitled VIDEO DISPLAY DRIVER APPARATUS which issued Aug. 22, 1989. Advantageously, the use of a complementary emitter follower driver in the Furrey apparatus significantly reduces the effective load capacitance of the display (kinescope load and stray capacitances) thereby improving positive and negative video signal transient response.

It has been recognized by White et al. in U.S. Pat. No. 5,680,173 entitled KINESCOPE DRIVER APPARATUS, which issued Oct. 21, 1997, that significant further improvements may be made in kinescope driver amplifiers of a type having a complementary emitter follower output coupling stage. Specifically, in the White et al. apparatus a push-pull complementary emitter follower amplifier is coupled between the output of a high voltage driver amplifier and the cathode of a kinescope for reducing the effective capacitance presented to the driver amplifier that is attributable to the kinescope cathode, socket, spark gaps and related stray capacitance. A secondary undesired capacitance loading of the amplifier attributable to the collector-to-base capacitances of the follower amplifier is effectively reduced by regulating the collector-to-emitter voltages of the push-pull follower output transistors at respective substantially constant values thereby improving parameters such as the slew rate and bandwidth of the overall video display system.

In the prior art discussed above, a desirable reduction in load capacitance has been achieved by using emitter follower load isolation (Furrey) and a further reduction in load capacitance was achieved by regulating the collector-emitter voltages of the follower transistors (White et al.).

It is herein recognized that a need exists for further improvements in kinescope driver amplifiers of a type employing positive feedback for emitter follower capacitance reduction in applications where it is also desired to provide accurate sensing of the kinescope cathode current for purposes such as automatic kinescope bias (hereafter "AKB") control. The present invention is directed, in a first respect, to meeting that need.

The present invention relates to kinescope driver apparatus of a type comprising a complementary emitter-follower amplifier having an input coupled to a video amplifier for receiving a video signal and having an output coupled to a cathode of a kinescope. A feedback circuit is provided for applying respective positive feedback voltages to respective collectors of first and second output transistors of the complementary emitter follower for maintaining substantially constant collector-to-emitter voltages for the output transistors and an AKB current sensor is connected in a collector circuit of the second output transistor for sensing cathode current of the kinescope.

In accordance with the invention, the output of the complementary emitter follower is coupled via a threshold conduction switch means to the emitter of the first output transistor and is coupled via resistive means to the emitter of the second output transistor.

In accordance with a further feature of the invention, the feedback circuit has an input connected to a junction of the threshold conduction switch means and the emitter of the first output transistor.

In accordance with another feature of the invention, a capacitor is coupled in parallel with the threshold conduction switch means between the emitter of the first output transistor and the output of the complementary emitter follower.

The foregoing and further features of the invention are illustrated in the accompanying drawings, wherein like elements are designated by like reference numbers, and in which.

Figure 1:
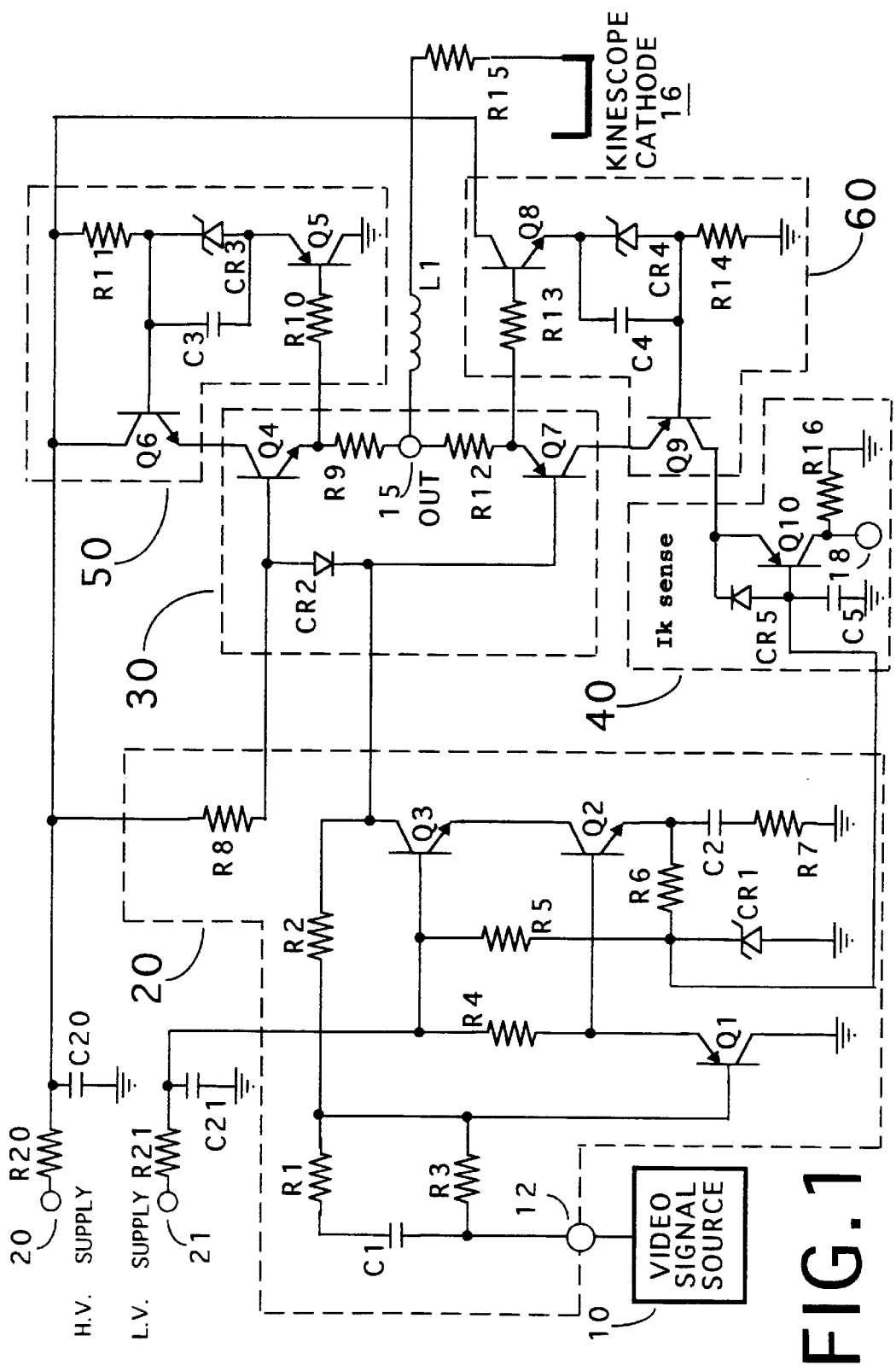
FIG. 1 is a schematic diagram, partially in block form, of a prior art kinescope driver apparatus having complementary emitter follower cathode isolation and AKB current sensing.

It is helpful to an understanding of the present invention to first consider the FIG. 1 which is an embodiment of the kinescope driver apparatus of White et al. in U.S. Pat. No. 5,680,173 mentioned above, and the problem of using conventional push-pull emitter follower buffer amplifiers for isolating the kinescope cathode capacitance from the output of the kinescope driver amplifier. As previously explained, the emitter follower amplifier is effective in reducing the capacitance attributable to the cathode (and associated strays) that is presented to the output of the high voltage video driver amplifier. However, the follower amplifier itself may introduce a capacitance loading effect on the driver amplifier and may tend to limit the overall system performance.

White et al. point out that the main source of undesirable capacitance loading effects in kinescope driver systems of the type using push-pull emitter followers is attributable to the collector to base capacitances of the follower output transistors. Typically, these capacitances are smaller than the kinescope cathode capacitance and isolating the cathode by an emitter follower amplifier provides an overall capacitance reduction and improvement in slew rate and bandwidth as compared with direct coupled systems. However, to achieve the maximum benefit of emitter follower isolation, it is desirable to reduce the effective capacitance of the emitter follower amplifier itself.

To achieve an effective reduction in follower capacitance in the White et al. apparatus, feedback is used in such a manner as to reduce the flow of current under dynamic signal conditions in the collector to base capacitances of the follower transistors. This is achieved by applying the feedback to maintain a substantially constant collector to emitter voltage for the follower transistors. This maintains a constant collector to base voltage. As a result, under dynamic signal conditions, there is little or no charging or discharging of the collector to base capacitances as the signal voltage varies.

The effective reduction in follower input capacitance attributable to the transistor collector to base capacitances is a function of the percentage of feedback applied to regulating the collector to emitter voltage. If, for example, the feedback percentage is selected such that collector to emitter voltage variations are reduced by fifty percent, then the reactive currents charging and discharging the collector to base capacitances of the follower amplifier will be also reduced by fifty percent and the "effective" capacitance loading will be cut in half. Greater reductions in follower capacitance may be achieved as the feedback percentage is increased towards unity. For purposes of circuit stability, provisions were made to ensure that the feedback gain cannot equal or exceed unity. This is achieved by connecting all "active" semiconductor devices in the feedback paths in voltage or "emitter" follower configurations.

FIG. 1 herein illustrates an embodiment of the White et al. apparatus which includes cathode current sensing for AKB control and is described herein in order to provide a foundation for the improvements of the present invention. FIG. 1 shows a television display system including a video signal source 10 for supplying a video signal to a kinescope cathode 16 for display. To simplify the drawing, the details of the kinescope and the signal source are not shown. It will be appreciated that for a color system there would be three driver amplifiers.

As an overview, to amplify the video signal to the high voltage levels required at cathode. 16 the system includes a cascode type of high voltage amplifier 20 (outlined in phantom). To isolate the output of the high voltage amplifier 20 from the capacitance of the kinescope cathode 16 the output of amplifier 20 (collector of transistor Q3) is coupled to cathode 16 via a push pull complementary emitter follower amplifier 30 (outlined in phantom). To protect the driver amplifier from kinescope arcs, the follower output terminal 15 is coupled to the cathode 16 by means of a kinescope arc protection resistor R15 and inductor L1. To provide for automatic kinescope bias (AKB) operation, a cathode current sensing circuit 40 ("$I^k$ sense", outlined in phantom) is provided which senses the collector current of a PNP transistor (Q7) in the push-pull emitter follower amplifier 30 to generate an AKB output signal at output terminal 18 proportional to the cathode current, $I_k$, of the kinescope cathode 16. This feature is optional and may be omitted.

Finally, to reduce the effective capacitance presented to the high voltage amplifier which is attributable to the collector to base capacitances of the complementary emitter follower 30, the system includes a feedback control circuit 50 (outlined in phantom) which maintains a substantially constant collector emitter voltage for the NPN transistor Q4 of the follower 30 and another feedback control circuit 60 (outlined in phantom) which maintains a substantially constant collector emitter voltage for the PNP transistor Q7 of follower 30. The operation of the follower transistors at constant collector to emitter voltages maintains the collector to base voltages at a nearly constant value reducing the magnitude of the charging and discharging currents of the collector to base capacitances of the follower transistors. The beneficial result is that, since the driver amplifier 20 does not have to supply charging and discharging currents for these "parasitic" capacitances, the overall slew rate, bandwidth and transient response characteristics are improved.

High voltage power (e.g., 200 volts or so) for operation of the amplifier 20 and the feedback or regulator circuits 50 and 60 is provided by high voltage (H.V.) supply terminal 20. Decoupling of the high voltage supply (20) is provided by a decoupling network or low pass filter comprising resistor R20 and capacitor C20. A low voltage (L.V.) supply terminal 21 provides a relatively low voltage (e.g., 12 volts or so) for biasing the input and cascode stages of the high voltage video driver amplifier 20. This supply input is also decoupled by means of an RC network comprising resistor R21 and capacitor C21.

The high voltage driver amplifier 20 comprises an NPN common emitter connected input transistor Q2 connected in cascode with a common base connected NPN output transistor Q3. A fixed base bias voltage for the cascode output transistor Q3 is provided by the low voltage (e.g., +12 volts) decoupling network (R21, C21). A lower potential for operation of the emitter load resistor R6 of the input transistor Q2 is provided by a Zener diode regulator comprising resistor R5 and Zener diode CR1 coupled between the base of transistor Q3 and ground. Illustratively, the Zener voltage may be 5 or 6 volts which establishes a DC reference for the load resistor R6 of the cascode input transistor as well as a DC reference for the AKB sense amplifier 40. The emitter electrode of the input transistor Q2 is also coupled to ground via a high frequency peaking network comprising resistor R7 and capacitor C2 which are coupled in series.

The video input signal to be amplified, provided by source 10, is applied to the base of the cascode input transistor via an emitter follower input stage comprising PNP transistor Q1 which is connected at the collector thereof to ground and coupled at the base thereof to the video input terminal 12 via an input resistor R3. The emitter of transistor Q1 is coupled to the base of transistor Q2 and to the low voltage supply 21 via an emitter resistor R4. Additional high frequency peaking is provided by a further peaking network comprising series connected resistor R1 and capacitor C1 coupled in parallel with the input resistor R3.

The collector load for the cascode amplifier 20 is provided by resistor R8 which is coupled from the high voltage supply 10 to the collector of the cascode output transistor Q3. A diode CR2 is interposed between the load resistor R8 and the collector of transistor Q3 to provide a small offset voltage for reducing cross-over distortion in the complementary emitter follower amplifier 30.

During operation of the cascode amplifier 20, the open loop gain is directly proportional to the value of the load resistor R8 and inversely proportional to the impedance of the emitter network R6, C2 and R7 as previously discussed. The open loop gain, bandwidth and slew rate is also a function of the capacitive loading of the output of amplifier 20 (i.e., the capacitance presented to the collector of transistor Q3). This capacitance is reduced by operating the push-pull transistors of the complementary emitter follower amplifier 30 at constant collector to emitter voltages. The closed loop gain, assuming that the open loop gain is adequate, is directly proportional to the value of the feedback resistor R2 and inversely proportional to the impedance of the input network R1, R3 and C1.

The push-pull complementary emitter follower amplifier 30 includes a pair of complementary transistors Q4 and Q7 coupled at base electrodes thereof to the output (collector of Q3) of amplifier 20 and coupled at the emitters thereof to an output terminal 15 via respective emitter resistors R9 and R12. The output 15 of emitter follower amplifier 30 is coupled, as previously noted, to the cathode 16 via a kinescope arc suppression network comprising the series connection of inductor L1 and resistor R15. Supply voltage (collector potentials) for the follower transistors Q4 and Q7 are provided by respective feedback circuits 50 and 60.

Circuit 50 regulates the collector to emitter voltage of follower transistor Q4 at a fixed value and includes a voltage regulator transistor Q6 connected at the collector thereof to supply 20 and at the emitter thereof to the collector of transistor Q4. The input (base) of the voltage regulator transistor Q6 is coupled to the emitter electrode of the follower transistor Q4 via a capacitor C3 in parallel with a threshold conduction device, Zener diode CR3. This positive feedback path establishes a substantially constant collector to emitter offset voltage for follower transistor Q4 that is equal to the Zener voltage. To provide an operating current for the Zener diode, the cathode is coupled to the high voltage source 20 via resistor R11. To minimize loading of the emitter circuit of transistor Q4, the emitter is coupled to the capacitor C3 and Zener diode CR3 via an emitter follower transistor Q5. Specifically, transistor Q5 is a PNP transistor coupled at its base to the emitter of the follower transistor Q4 via a resistor R10. The collector-emitter path of follower transistor Q5 is coupled between the junction of capacitor C3 and Zener diode CR3 and ground.

Circuit 60 is similar to circuit 50 and regulates the collector to emitter voltage of follower transistor Q7 at a fixed value. Circuit 60 includes a voltage regulator transistor Q9 connected at its collector to a supply input of the $I_k$ sense amplifier 40 and at its emitter to the collector of transistor Q7. The input of the voltage regulator transistor Q9 is coupled to the emitter electrode of the follower transistor Q7 via a capacitor C4 in parallel with a threshold conduction device, Zener diode CR4. This feedback path regulates the collector emitter voltage of the follower transistor Q7 to the Zener voltage. To provide an operating current for the Zener diode, the anode thereof is coupled to ground via a resistor R14. To minimize loading of the emitter circuit of transistor Q7, the emitter is coupled to the capacitor C4 and Zener diode CR4 via an emitter follower transistor Q8. Specifically, transistor Q8 is a NPN transistor coupled at its base to the emitter of the follower transistor Q7 via a resistor R13. The collector-emitter path of transistor Q8 is coupled between the junction of capacitor C4 and Zener diode CR4 and the high voltage supply 20.

The $I_k$ sense amplifier 40 is provided for use in video display systems of the type featuring automatic kinescope bias (AKB) circuitry and thus requiring sensing of the kinescope cathode current "$I_k$". Sense amplifier 40 comprises a cathode current sensing transistor Q10 connected at the emitter thereof to the collector of the voltage regulator transistor Q9. A reference potential for the base of transistor Q10 is provided by the Zener diode CR1. Capacitor C5, in parallel with diode CR1 provides filtering of the regulated Zener voltage. An output voltage, proportional to the cathode current $I_k$ is developed at output terminal 18 across the load resistor R16 coupled between the collector of transistor Q10 and ground. In applications not requiring AKB operation the sense amplifier may be omitted. If omitted then the collector of voltage regulator transistor Q9 should be coupled to ground or another suitable low voltage reference potential.

To summarize the operation described above, the cascode amplifier 20 amplifies the video signal provided by source 10 as previously described. To minimize the capacitive loading on load resistor R8 that is attributable to the capacitance associated with the kinescope 16, its socket and spark arrestors (not shown) and other stray capacitances, the output (collector of transistor Q3) of the cascode amplifier 20 is coupled to the kinescope cathode electrode via a push-pull complementary emitter follower amplifier 30. This particular follower amplifier is of the "parallel" type in which the base electrodes are in parallel for receiving the amplified video signal and the emitters are in parallel for driving the cathode.

The inclusion of the emitter follower amplifier 30 provides a reduction in cathode capacitance presented to the amplifier 20 but introduces a secondary capacitance effect. Namely, the collector to base capacitances of follower transistors Q4 and Q7. To effectively reduce the values of these unwanted capacitances, the reactive charging and discharging currents supplied to these capacitances are reduced. This feature is provided by the two positive feedback regulators 50 and 60 which maintain the collector to emitter voltages for the follower transistors at constant values.

As an example, if the output voltage of amplifier 20 increases, then the emitter voltage of follower transistor Q4 will increase but Zener diode CR3 and regulator transistor Q6 will increase the collector voltage of follower transistor Q4. Similarly, for a decreasing output voltage of amplifier 20, the emitter voltage of follower transistor Q4 will decrease and Zener diode CR3 and regulator transistor Q6 will cause a decrease in the collector voltage of follower transistor Q4. Illustratively, for a Zener voltage of 10 Volts, the collector emitter voltage of transistor Q4 will equal the Zener voltage. For the assumed Zener voltage of 10 volts, the resultant collector-emitter voltage of transistor Q4 will be approximately 10 Volts.

Thus, whether the follower input voltage is increasing or decreasing, the voltage across the follower transistor from the collector to the emitter is constant. As the input signal goes through points of inflection, the base voltage will vary by a few hundred millivolts relative to the emitter as the follower transistor is biased on and off (push-pull operation). However, it has been found that base emitter voltage variations are relatively minor as compared with the regulated collector emitter voltage (e.g., a Zener voltage of 10 volts or so). As a result, one may consider collector to base voltage variations "substantially" constant and there can be little charging and discharging of the collector to base capacitance under dynamic signal conditions. Since such reactive currents are suppressed, the effective collector to base capacitances are reduced for the follower amplifier.

As described above, the feedback for regulating the collector emitter voltages for the follower transistors is nearly one hundred percent but cannot equal . unity since that would require infinite current gains of transistors Q5 and Q6. In other words, transistors Q5 and Q6 are both connected as emitter followers and the gain is close to but less than unity. Accordingly, even though the feedback is positive, the circuit is stable. Lesser amounts of feedback, e.g. 50%, may be used if desired in a given application. It should be noted that the actual Zener voltage is not a critical parameter of the circuit. The Zener by-pass capacitor (C3 or C4) provides a desirable reduction in AC impedance of the voltage regulator to further facilitate wideband operation.

Figure 2:
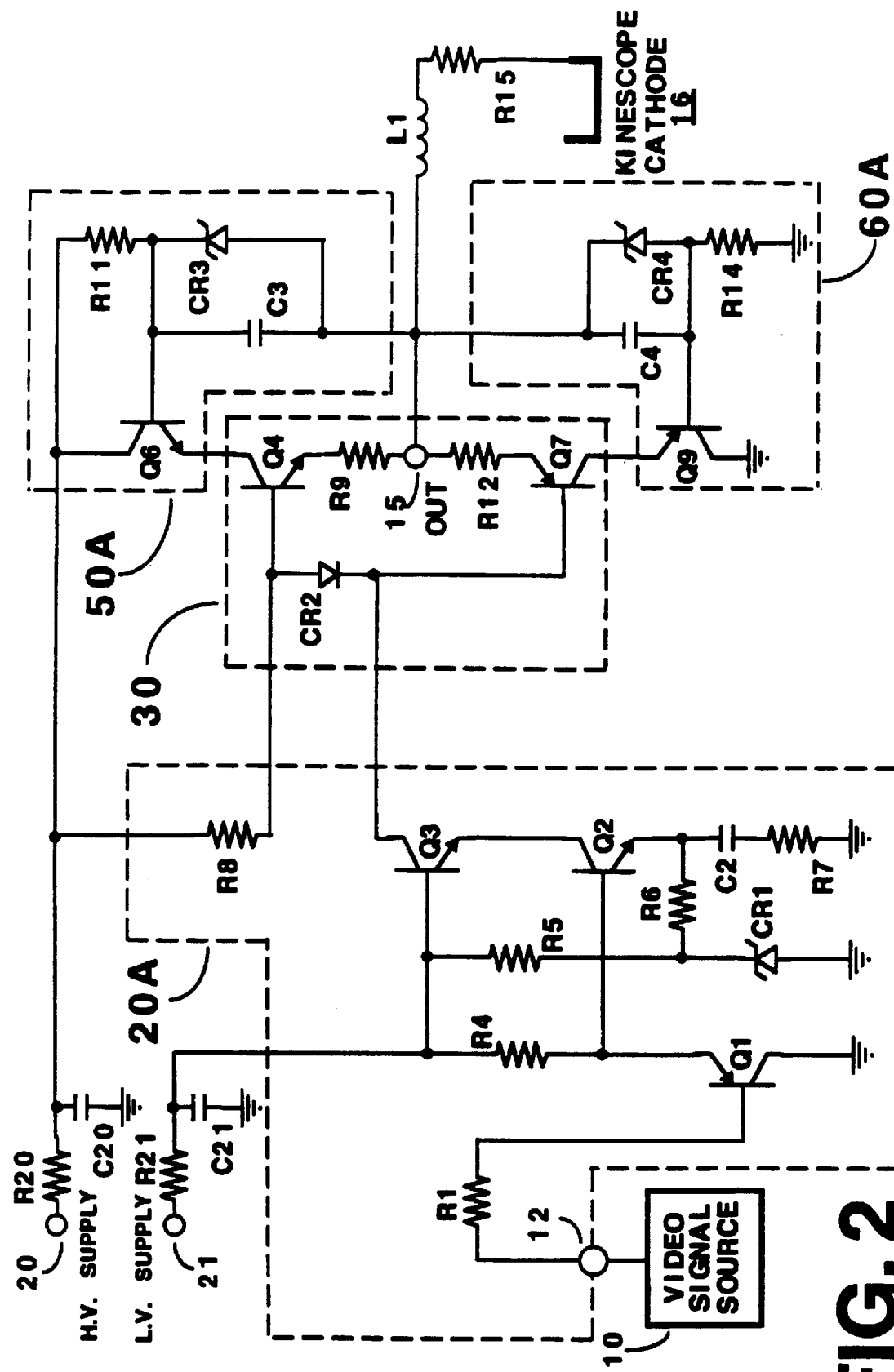
FIG. 2 is a schematic diagram, partially in block form, of another embodiment of a prior art kinescope driver apparatus.

FIG. 2 illustrates a second embodiment of a kinescope driver disclosed by White et al. In this embodiment, a reduction in the overall number of parts is realized by eliminating transistors Q5 and Q6 and resistors RIO and R13 and connecting feedback control circuits 50B and 60B and follower amplifier 30A as shown. However, this embodiment is not fully suitable for use with the AKB sensing described above because adding an AKB sensing circuit to the second embodiment causes unwanted currents to flow through the AKB sensing circuit during AKB intervals thereby adversely affecting the accuracy of AKB control. This effect, among others, is addressed in the present invention as discussed below.

Figure 3:
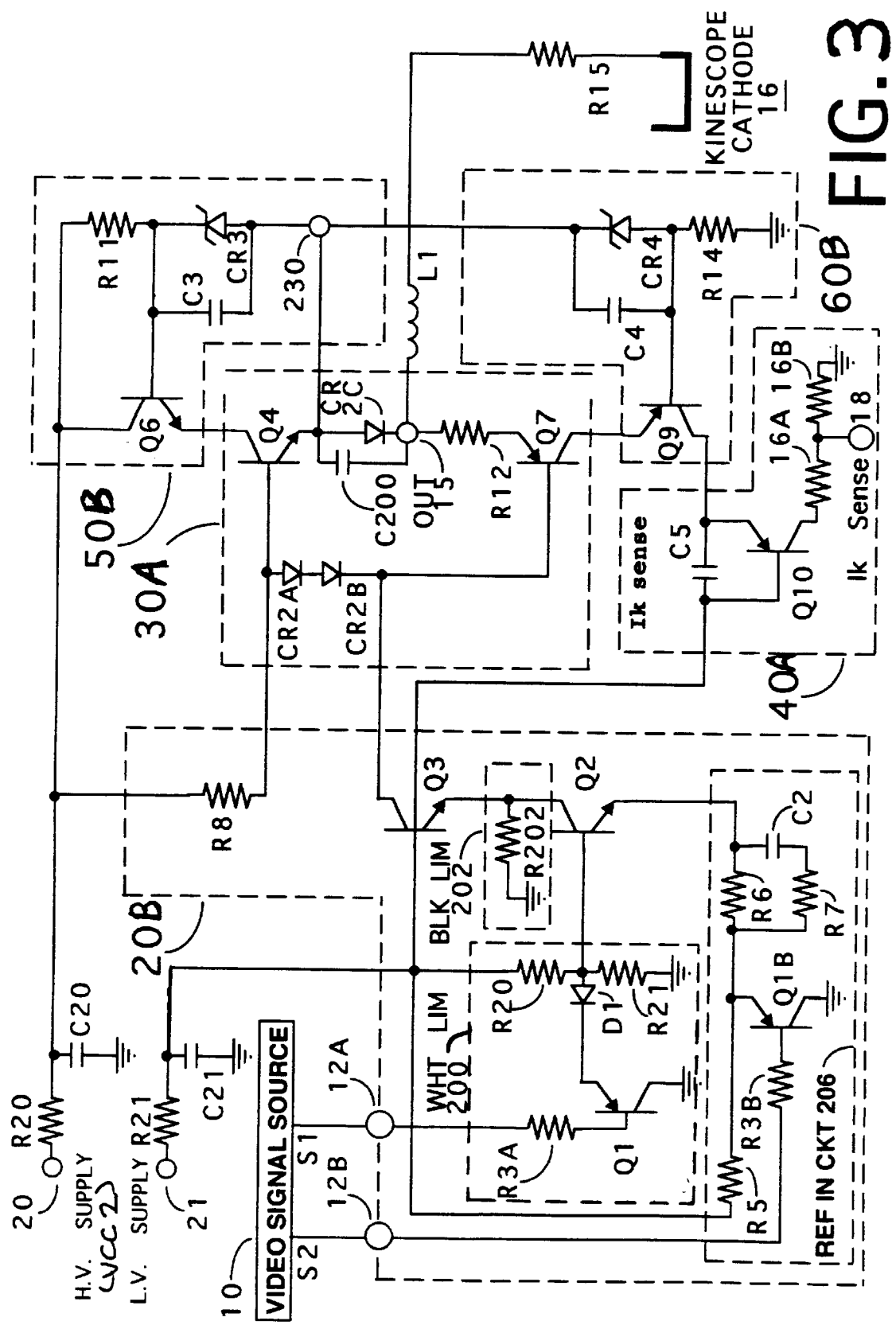
FIG. 3 is a schematic diagram, partially in block form, of a kinescope driver apparatus embodying the invention.

FIG. 3 illustrates improvements, in accordance with the present invention, over the apparatus of White et al. described above. The kinescope driver of the present invention also employs emitter follower coupling of a video amplifier to a kinescope with positive feedback for reducing the emitter follower capacitance and with AKB current sensing. Where the output stage emitter follower amplifier of the White apparatus required six active components (Q4–Q9), the present invention requires only four active components (Q4, Q6, Q7 and Q9). Further improvements, in accordance with the invention, include improved AKB sense operation, improved AC operation of the output stage, the addition of a differential reference input stage, the addition of white and black limiting circuitry in the video amplifier stage, and heat sink bootstrapping.

As shown in FIG. 3, the AKB sense circuit of the present invention comprises an emitter follower transistor Q10 connected at its base input to the low voltage supply terminal 21, at its collector to a resistor divider network (R16A and R16B), and at its emitter to the collector of transistor Q9. A capacitor C5 is connected in parallel across the base/emitter junction of Q10 to provide buffering action.

Improved AKB sensing operation is achieved for DC output voltages greater than approximately VCC2(R14/(R14+R11)). The net current into threshold conduction devices (Zener diodes) CR3 and CR4 is positive and supplied by transistors Q4 and Q6. For the case when resistor R14 is equal to resistor R11, positive net current into diodes CR3 and CR4 occurs for DC output voltages greater than approximately one half that of the high voltage supply at terminal 20 (e.g., VCC2). This gives more than enough range for AKB sense cutoff measurements. For DC conditions, the output bias diode network of CR2A and CR2B results in diode CR2C having approximately zero volts across it, thus CR2C does not conduct. Under these conditions, with diode CR2C biased off, the DC cathode current has to flow through transistor Q7's emitter electrode and hence the collector current of transistor Q9 represents the CRT cathode current through inductor L1 and resistor R16 with an error equal to the sum of the reciprocals of the betas of transistors Q7 and Q9.

The buffering action of AKB sense transistor Q10 and capacitor C5 provide DC and AC low impedance at the collector of transistor Q9 and also the necessary limiting of the "$I_k$ Sense" voltage which is proportional to the CRT cathode current. The low impedance at the collector of transistor Q9 is desirable for maintaining the frequency response of the CRT driver stage. The limiting action is desirable because peak cathode currents can reach the 10's of mA, while the AKB cutoff currents are in the 10's of $\mu$A. For higher cathode currents, transistor Q10 saturates and its collector voltage is limited to VCC1+Vbe (the base/emitter voltage of transistor Q10). Resistor divider network R16A and R16B further attenuate the peak $I_k$ sense voltage. At cutoff, transistor Q10 operates in its linear region as a common base stage and the voltage at $I_k$ is substantially equal to the CRT cathode current multiplied by resistor R16B (assuming high impedance sensing).

The AC Operation of the Boot-Strap output stage is essentially the same as in the White et al. apparatus. That is, the collector to base input capacitances, $C_{cb}$, of transistors Q4 and Q7 are canceled by the near unity positive voltage feedback to the collectors of said devices for frequencies appreciably less than $F_T$ of Q4 and Q7. Advantageously, the near unity feedback is achieved using one less active component (transistor) in each feedback circuit than required in the White et al. apparatus. Also, capacitor C200 has been provided across threshold conduction device (diode) CR2C to reduce the small signal AC coring of the signal that drives the CRT cathode.

The addition of a reference input circuit (206), an emitter follower transistor (Q1B) stage, causes the collector current through transistors Q2 and Q3 to be proportional to the voltage difference between the "Video IN" and "Ref IN" inputs (terminals 12A and 12B, respectively), thereby providing good ground difference rejection between the small signal sections of the TV or display and the large signal CRT driver stage. (For this purpose, the video signal source 10 provides the video signal S1 to input 12A and also provides a video signal reference voltage S2 to input 12B of the cascode amplifier 20.) Lack of adequate ground signal rejection could lead to "regeneration", ringing, and extraneous noise and artifact pickup. By making both the "Video IN" (12A) and "Ref IN" (12B) inputs high impedances, signal radiation from signal or ground currents is reduced.

White limiting circuit 200 (outlined in phantom) comprises transistor Q1, diode D1, and resistors R20 and R21. This is desirable because saturation of transistors Q3, Q4 or Q7 caused by excess peak white drive can result in the stretching of momentary overdrive into objectionable smears. The action of transistor Q1, and resistors R20 and R21 is sufficient to provide limiting but the addition of diode D1 softens and produces a more pleasing limiting action. Additionally, diode D1 results in an approximately net zero $V_{be}$ temperature compensation for the differential input (Ref IN) 12B.

It may be appreciated that the side of resistor R21 shown attached to ground may be attached to the emitter of the reference input transistor Q2 instead of ground. This will provide essentially the same limiting action but referenced to the "Ref IN" signal rather than to ground.

Although less severe in effect than excess peak whites, excess peak "blacker than black" peaks can result in the collapse of the collector to emitter voltage, $V_{ce}$, across transistor Q3 and cause an undesirable stretching of these excessively large black transients into wider, more visible artifacts. This condition is eliminated by the addition of resistor R202 between the emitter of transistor Q3 and ground. The DC current flowing through resistor R202 from the common base transistor Q3 is selected to prevent collapse of the voltage across transistor Q4 even when there is no current flowing through the emitter of transistor Q4.

The frequency response of the CRT driver and its limiting slew rate are determined primarily by the net capacitance ($C_c$) at the collector of transistor Q3 (the output of the video amplifier) and the value of resistor R8. Capacitor C2 is chosen so that the product of $(R8)(C_c)$ is equal to the product of $(R7)(C2)$. This compensates for the small signal roll off caused by the net capacitance, $C_c$, of transistor Q3 and resistor R8. During large black-going transitions, however, this compensation does not work since the collector current of transistors Q3 and Q2 cannot go negative.

It is desirable to reduce the effective value of $C_c$ as much as possible in order to produce the best large signal response for a given value of resistor R8 which sets the power dissipation of transistor Q3. The sources of net capacitance, $C_c$, of transistor Q3 include the input capacitances of transistors Q4 and Q7, the collector-base capacitance, $C_{cb}$, of transistor Q3, the wiring capacitance, and the capacitance of the heat sink for transistor Q3.

By bootstrapping the collector electrodes of transistors Q4 and Q7 and operating them as emitter followers, the input capacitances of transistors Q4 and Q7 are virtually eliminated.

The heat sink capacitance of transistor Q3 shows up as a capacitor from the collector of transistor Q3 to the actual heat sink which is typically a metal assembly. The capacitance added by the heat sink of transistor Q3 can be screened out or "bootstrapped" by electrically connecting the heat sink of transistor Q3 either to the signal at output terminal 15 or at the emitter of transistors Q4 or Q7. The voltage at the emitters of transistors Q4 and Q7 follows the voltage at the collector of transistor Q3 and has a positive gain that is slightly less than one.

Figure 4:
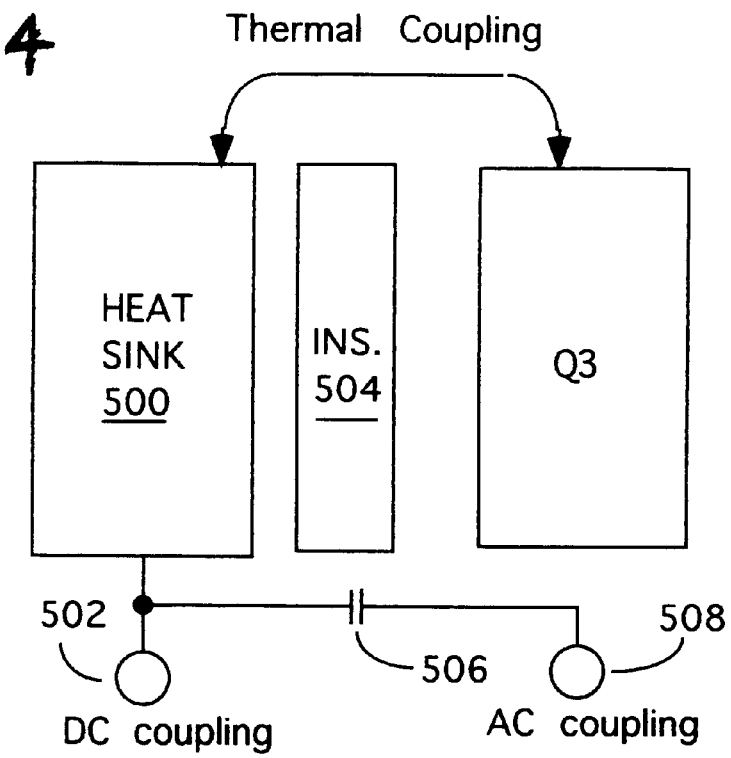
FIGS. 4 and 5 are block diagrams, partially in schematic form, illustrating further features of the invention for effecting load capacitance reduction in conjunction with the apparatus of FIG. 3.

FIG. 4 shows apparatus for reducing the effective capacitance of the heat sink by positive feedback. Here, the output at the emitters of transistors Q4 or Q7 or at the output terminal 15 is applied either by DC or AC coupling to the heat sink 500 of transistor Q3. Transistor Q3 is thermally coupled to the heat sink 500. For DC shielding, the output of transistors Q4 or Q7 or the output terminal 15 is directly applied to heat sink 500 via terminal 502 or is AC coupled via capacitor 506 and AC coupling terminal 508. In either case, there is a beneficial net reduction in effective load capacitance for the driver amplifier 30 and so the bandwidth and slew rate is extended.

Figure 5:
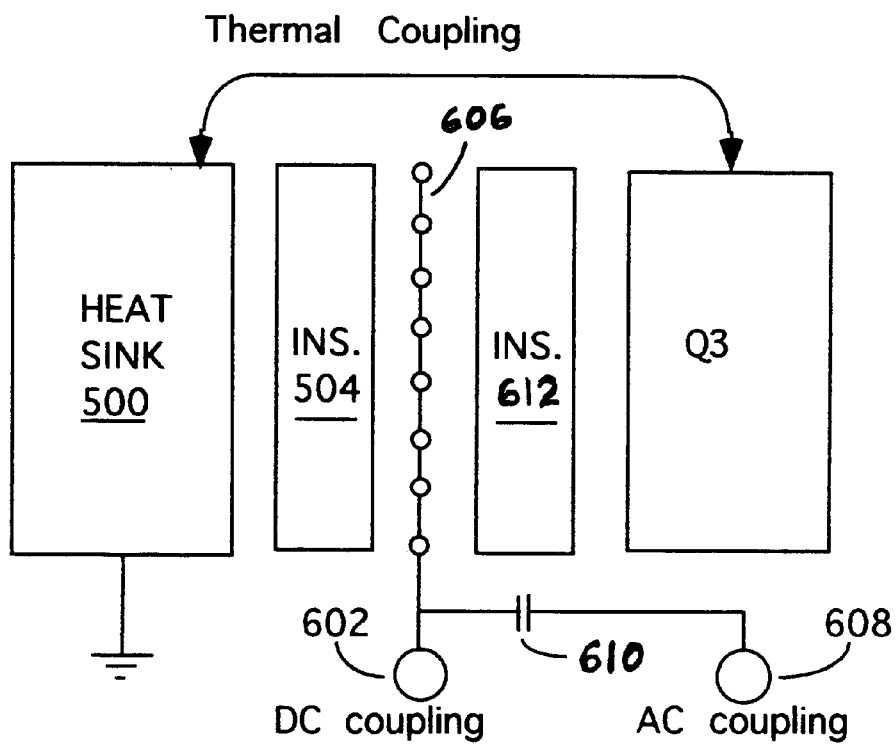

As shown in FIG. 5, the heat sink may also be grounded (providing a safety advantage) with the positive feedback applied to a screening conductor 606 via a direct connection (DC coupling terminal 602) or by AC coupling (capacitor 610 and AC coupling terminal 608) to the emitter of transistor Q4, the emitter of transistor Q7 or to the output terminal 15. This approach is less thermally and electrically efficient but has certain safety advantages such as avoiding a dangerous potential on the heat sink.

The examples of AC coupling of the feedback voltage to the heat sink or to the screen advantageously reduces the safety hazard at the heat sink while remaining nearly as effective as DC coupling via terminals 502 or 602.

What is claimed is:

1. A display driver comprising:
    a video amplifier coupled to a source of a video signal;
    an isolation means comprising first and second transistors and having an input coupled to said video amplifier and an output coupled to a kinescope cathode;
    first and second feedback circuits respectively coupled to said first and second transistors; and
    a current sensing circuit coupled to said isolation means for sensing current of said kinescope cathode during an inactive portion of said video signal, said current sensing circuit coupled to automatic kinescope bias circuitry, characterized by
    a coupling and decoupling circuit disposed between said first transistor and said output of said isolation means for coupling said first transistor to said output during an active portion of the video signal and decoupling said first transistor from said output during said inactive portion of said video signal.

2. The display driver according to claim 1, characterized in that said isolation means is a complimentary emitter follower amplifier.

3. The display driver according to claim 1, characterized in that said coupling and decoupling circuit includes threshold conduction switch means coupled to an emitter of said first transistor and to said output of said isolation means.

4. The display driver according to claim 3, characterized in that said first feedback circuit is coupled to a junction of said threshold conduction switch means and to said emitter of said first transistor.

5. The display driver according to claim 3, characterized in that a capacitor is coupled in parallel with said threshold conduction switch means between said emitter of said first transistor and said output of said isolation means.

6. The display driver according to claim 3, characterized in that said first and second transistors are arranged in a push-pull configuration with respect to said output of said isolation means.

7. The display driver according to claim 3, characterized in that said first transistor is of a first conduction type, said second transistor is of a second conduction type opposite to said first transistor, and said first and second transistors are arranged in a complimentary push-pull configuration with respect to said output of said isolation means.

8. The display driver according to claim 7, characterized in that said first and second transistors are bi-polar transistors and said respective output electrodes are emitter electrodes.

9. The display driver according to claim 7 or 8, characterized in that said threshold conduction switch means is a diode.

10. The display driver according to claim 2, characterized in that said active portion of said video signal includes video program information, said inactive portion of said video signal corresponds to a blanking interval, and said current sensing circuit is coupled to said second transistor for sensing current of said kinescope cathode during said blanking interval.

* * * * *